(12) United States Patent
Hashimoto et al.

(10) Patent No.: US 7,092,191 B2
(45) Date of Patent: Aug. 15, 2006

(54) MAGNETIC TAPE TRANSPORT SYSTEM GENERATING AIR PRESSURE BETWEEN MAGNETIC HEADS

(75) Inventors: Akihiro Hashimoto, Odawara (JP); Takahisa Izumida, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/990,369

(22) Filed: Nov. 18, 2004

(65) Prior Publication Data

US 2005/0152065 A1   Jul. 14, 2005

(30) Foreign Application Priority Data

Jan. 9, 2004 (JP) ............................. 2004-004260

(51) Int. Cl.
*G11B 15/64* (2006.01)
(52) U.S. Cl. ........................................ 360/71; 360/221
(58) Field of Classification Search ...................... None
See application file for complete search history.

(56) References Cited

U.S. PATENT DOCUMENTS

| | | | | |
|---|---|---|---|---|
| 4,747,006 A | * | 5/1988 | Miwa et al. ............. | 360/130.3 |
| 5,689,384 A | | 11/1997 | Albrecht et al. | |
| 6,122,147 A | * | 9/2000 | Fahimi et al. ......... | 360/130.21 |
| 2004/0120061 A1 | | 6/2004 | Yip et al. | |

FOREIGN PATENT DOCUMENTS

| JP | 60103510 A | * | 6/1985 |
|---|---|---|---|
| JP | 63023211 A | * | 1/1988 |
| JP | 02198055 A | * | 8/1990 |

OTHER PUBLICATIONS

"Vacuum Assist Method for Improvement of Data Reliability and Head to Tape Interface Performance for Tape Read/Write Heads," IBM TDB vol. 32, No. 9A, Feb. 1, 1990, pp. 267-268.*
"Vacuum Puffer Head to Prevent Tape Stick on Magnetic Head," IBM TDB vol. 30, No. 12, May 1, 1988, pp. 242-243.*
English Translation of JP63-23211, "Magnetic Head," Jan. 30, 1988.*

* cited by examiner

*Primary Examiner*—Hoa T. Nguyen
*Assistant Examiner*—James L Habermehl
(74) *Attorney, Agent, or Firm*—Sughrue Mion, PLLC (57) ABSTRACT

Disclosed is a magnetic tape transport system which has multiple magnetic heads arranged parallel to each other that a magnetic tape slides in contact with, and which has a structure to prevent a decrease in contact pressure between the magnetic tape and the magnetic heads. The magnetic tape transport system includes a supply reel for feeding the magnetic tape, a take-up reel for winding the magnetic tape fed from the supply reel, a plurality of magnetic heads being arranged parallel to each other, a partition plate for dividing a space between the magnetic heads into an air space and a close-tape space, a negative pressure generation means for setting a pressure in the air space to be lower than that in the close-tape space, and a communicating path for allowing the air space and the close-tape space to communicate with each other.

25 Claims, 9 Drawing Sheets

MAGNETIC TAPE TRANSPORT SYSTEM GENERATING AIR PRESSURE BETWEEN MAGNETIC HEADS

BACKGROUND OF THE INVENTION

1. Field of the Invention

An apparatus consistent with the present invention relates to a magnetic tape transport system for transporting a magnetic tape, which has multiple magnetic heads arranged parallel to each other in contact with the magnetic tape.

2. Description of the Related Art

In recent years, the high density recording design of magnetic recording media has advanced, and some backup media for computers have a recording capacity of several hundreds of gigabytes. For example, a magnetic tape has several hundreds of data tracks along the width, thereby achieving the high density recording design. Such a high density recording design involves excessive narrowing of the data tracks and of the intervals between the adjacent data tracks in a magnetic tape. Thus, in order to allow recording/reproducing devices of a magnetic head to trace such narrow data tracks, servo signals are written on a magnetic tape in advance, and the servo signals are then read by a magnetic head, while the position of the magnetic head relative to the magnetic tape (the position along the width of the magnetic tape) is servo-controlled (refer to Japanese Unexamined Patent Application No. 8-30942 (Paragraph No. 0004)).

The servo signals are written on corresponding non-magnetized servo bands on a magnetic tape by magnetizing the servo bands in one direction by use of a servo write head of a servo writer, to which a record current is supplied.

Figures 7A, 7B, 7C:
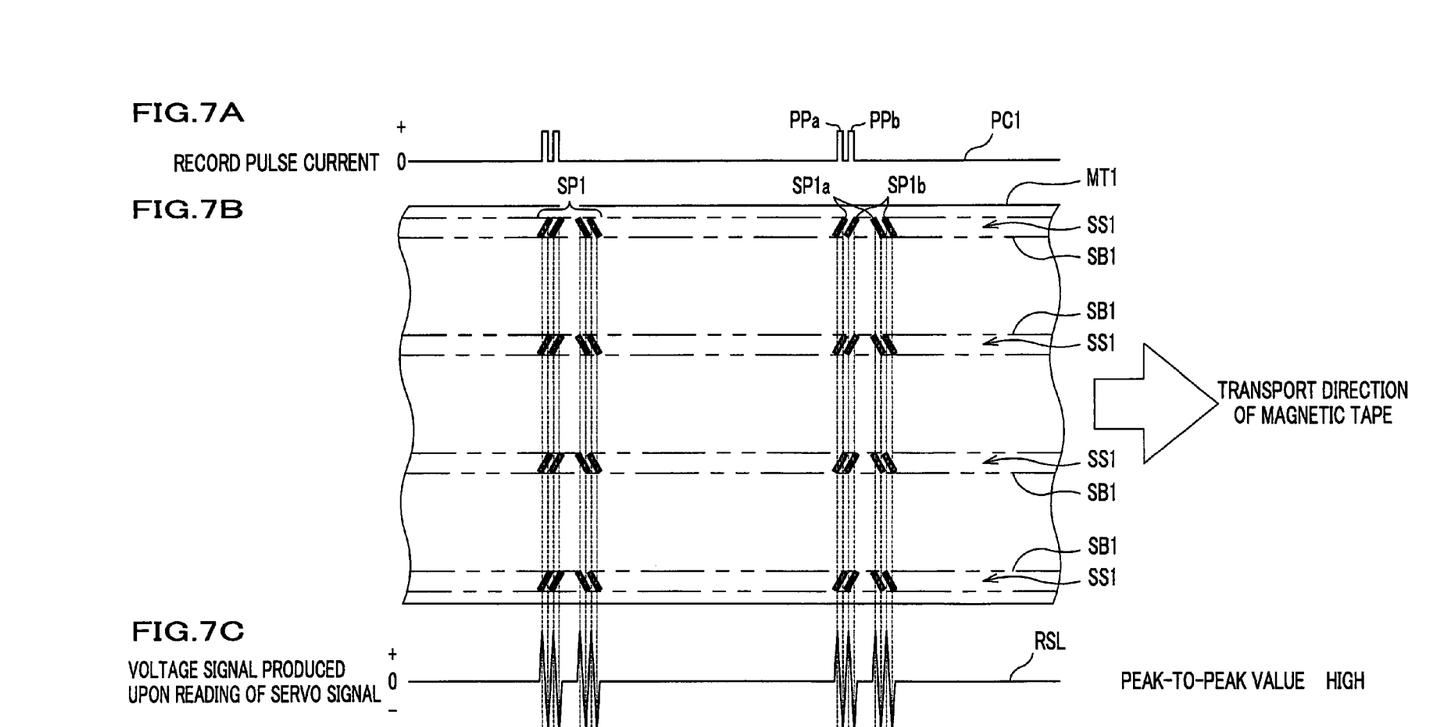
FIG. 7A is a signal waveform that is used when a servo signal is written on a conventional magnetic tape.
FIG. 7B is a plane view depicting the conventional magnetic tape.
FIG. 7C is a voltage signal waveform having a large peak-to-peak value, which is produced when the servo signal is read.

In a conventional type magnetic tape MT1 as shown in FIG. 7B, as a means of preventing the saturation of a servo signal read device (not shown) of a magnetic tape drive (not shown) upon reproduction, a record pulse current PC1 having positive pulses and zero pulses as shown in FIG. 7A is generated and used to form servo signals SS1. When the zero pulses of the record pulse current PC1 are supplied to a servo write head of a servo writer, the servo bands SB1 are not magnetized. Meanwhile, when the positive pulses are supplied, parts (servo patterns SP1) of the servo bands SB1 are magnetized in one direction. As a result, the servo signals SS1 are written. The servo write head for writing the servo signal SS1 has head gaps in the form of a symmetric trapezoid at predetermined angle with respective to the transport direction of the magnetic tape MT1. With these head gaps, servo patterns SP1a shown in FIG. 7B are formed when positive pulse currents PPa shown in FIG. 7A are fed to the servo write head, and servo patterns SP1b are formed when positive pulse currents PPb are fed.

A magnetic tape drive uses a servo signal read device to sense magnetic flux transitions of the servo signal SS1, based on a variation in an electric resistance of the servo signal read device, and outputs, as a read signal, a differential voltage waveform produced from the magnetic flux transitions being sensed. Accordingly, as the variation in the electric resistance of the servo signal read device is increased, the peak-to-peak value of the read signal is increased, in other words, the SN ratio of the read signal is enhanced. Specifically, if the magnetic flux transitions of the servo signal SS1 are great, or if the servo signal read device has a large sensing area, then the signal RSL generated upon reading of the servo signal SS1 acquires a large peak-to-peak value, as shown in FIG. 7C.

Figure 7D:
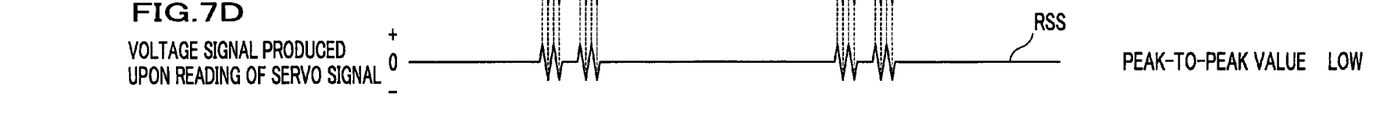
FIG. 7D is a voltage signal waveform having a low peak-to-peak value, which is produced when the servo signal is read.

In the future, it is expected that magnetic tapes will develop to have a recording capacity of several tens of terabytes. As such a high density recording design proceeds, the number of data tracks formed on a magnetic tape is increased, the width of data tracks and the interval between adjacent data tracks are further narrowed, and thus, a magnetic tape itself is thinner. This involves decrease in a magnetic quantity sensed upon reading of the servo signal SS1, that is, decrease in the magnetic flux transitions sensed by the servo signal read device. This causes lowering of the peak value of the voltage signal RSS produced upon reading of the servo signal SS1, as shown in FIG. 7D, and the SN ratio of the signal RSS is thus deteriorated. Consequently, a magnetic tape drive fails to read the servo signal SS1 correctly, and to exactly control the position of the magnetic head.

Figure 8A:
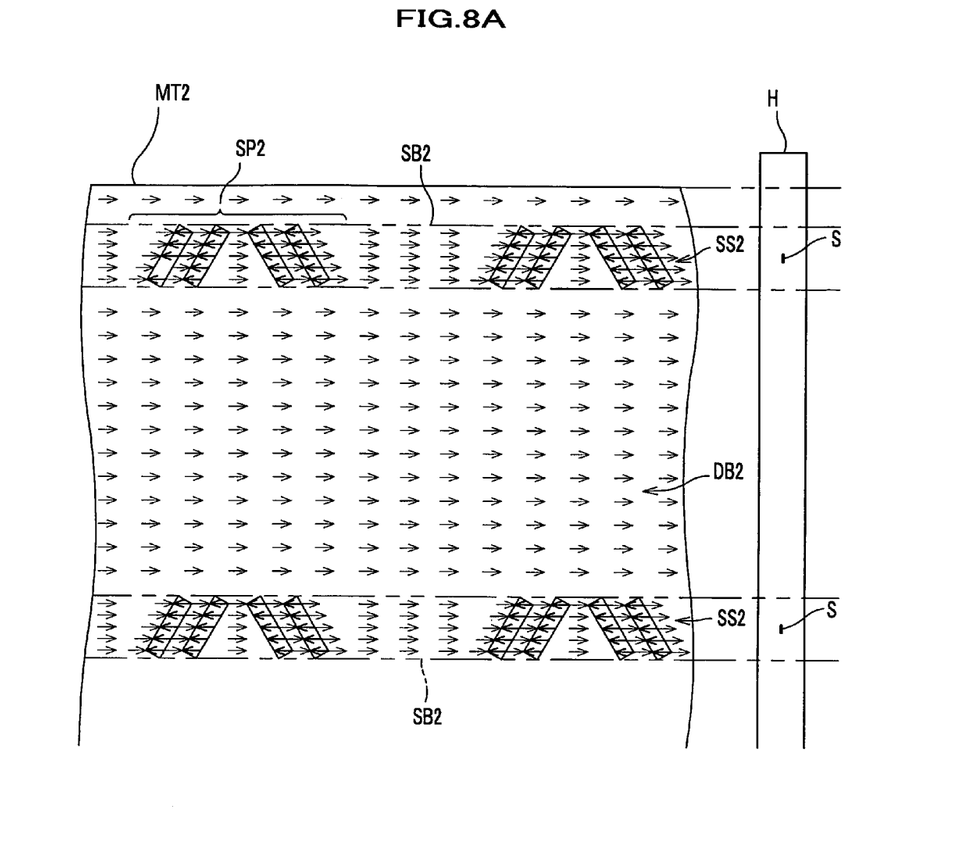
FIG. 8A is an enlarged plane view depicting a magnetized state of a DC-erased magnetic tape on which a servo signal is written.
Figure 8B:
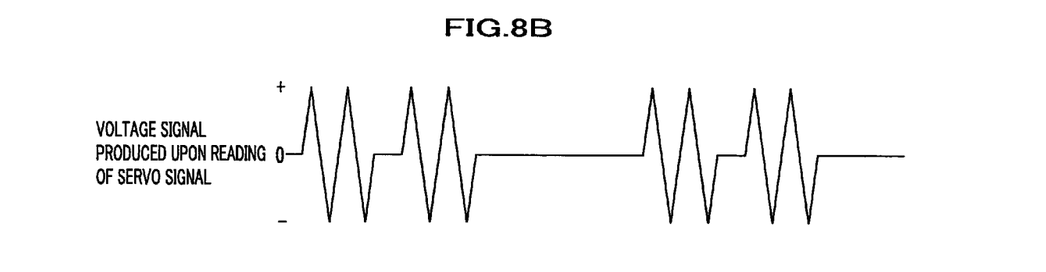
FIG. 8B is a voltage signal waveform that is produced when the servo signal is read.

To overcome this disadvantage, a technique disclosed in JP 2003-110396 (non-published) was conceived by this inventor. In this technique, as shown in FIG. 8A, a servo writer uses a DC erase head (not shown) to magnetize the servo bands SB2 in one direction (i.e. in the right direction in the figure) along the long side of the magnetic tape MT (DC magnetization) and, then uses a servo write head (not shown) to write the servo signals SS on the servo bands SB by magnetizing the parts of the servo bands SB in the opposite direction (i.e. in the left direction in the figure). In this figure, the magnetized directions are denoted by small arrows. The level of the voltage signal, which is generated upon reading of the servo signal SS2, is increased at a border where the orientation of the magnetization is changed. On the servo signal SS2, the magnetic orientations are greatly changed from the right to left directions in the figure, and the magnetic orientations are greatly changed from the left to right directions. Therefore, the voltage signal (see FIG. 8B), which is generated when a servo signal read device S of a magnetic head of a magnetic tape drive reads the servo signal SS2, has a large amplitude, thus improving the SN ratio of the voltage signal.

In addition, when the DC erase head magnetizes the servo bands SB2 in one direction along the long side of the magnetic tape MT2 (hereinafter, this process is referred to as "DC erase"), the DC erase head also DC-erases a data band DB2 to which data signal will be written later, as shown in FIG. 8A. In this case, remanent magnetization on the data band DB2 may cause noise upon reproduction of the data signal.

Figure 9:
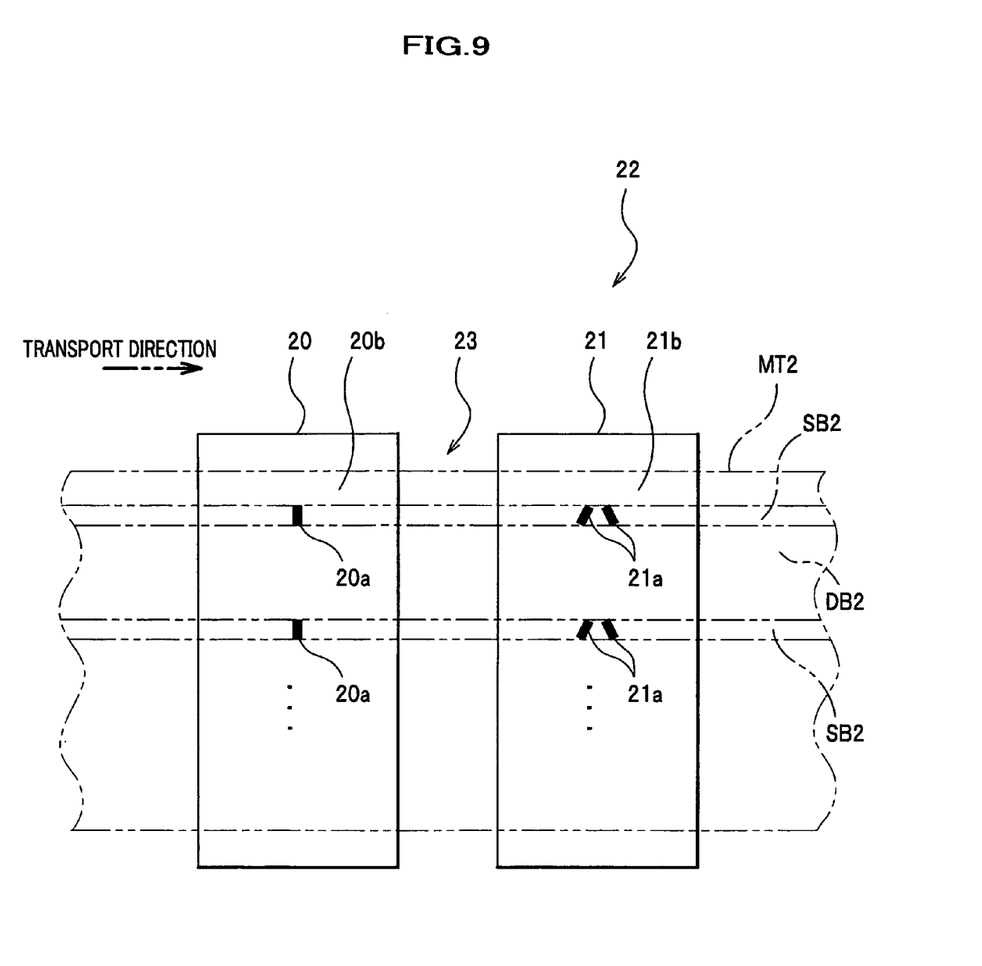
FIG. 9 is a plane view depicting a DC erase head and a servo write head of the servo writer, as seen from the direction of the magnetic tape MT2 being transported.

This disadvantage can be overcome by use of, for example, a servo writer 22 equipped with a DC erase head 20 and a servo write head 21 as shown in FIG. 9. FIG. 9 is a plane view depicting the DC erase head 20 and the servo write head 21 of the servo writer 22, as seen from the direction of the magnetic tape MT2 being transported. Referring to FIG. 9, each head gaps 20a of the DC erase head 20 and each head gap 21a of the servo write head 21 are arranged in the longitudinal (transport) direction of the magnetic tape MT2. Thanks to this arrangement, in writing the servo signals SS2 (see FIG. 8) on the corresponding servo bands SB2 of the magnetic tape MT2 being transported in the right direction of FIG. 9, the DC erase head 20 uses the head gaps 20a to subject only the servo bands SB2 to the DC-erase, and the servo write head 21 then uses the head gaps 21a to write the servo signals SS2 on the DC-erased servo bands SB2. This makes it possible to write the servo signals SS2 on the servo bands SB2 without DC-erasing the data band DB2. In this case, the DC erase head 20 and the servo write head 21 need to be arranged as close to each other as possible to the extent where the cross-talk therebetween does not occur. This is because the servo bands SB2 that have undergone the DC-erase must be prevented from shifting from the corresponding head gap 21a of the servo write head 21, when the magnetic tape MT2 is displaced in the lateral direction (upward and downward directions in FIG. 9) during the transport.

However, when the servo signals SS2 (see FIG. 8A) are written on the servo bands SB2 of the magnetic tape MT2 by the DC erase head 20 and the servo write head 21 arranged close to each other, airflow involved by the transport of the magnetic tape MT2 circulates within an air gap 23 between the two heads 20 and 21. This airflow within the air gap 23 then forces the magnetic tape MT2 to move away from the two heads. In this case, the contact pressure between the magnetic tape MT2 and the DC erase head 20 or the servo write head 21 may be decreased, thereby causing the writing error of the servo signals SS2. In addition, the magnetic tape MT2 may be displaced on magnetic tape contact surfaces 20b and 21b of the DC erase head 20 and the servo write head 21, respectively, in the lateral direction, thereby causing the shift of the DC-erased servo bands SB2 from the respective head gaps 21a of the servo write head 21.

The present invention has been conceived, taking the disadvantages above into account. An object of the present invention is to provide a magnetic tape transport system which is equipped with multiple magnetic heads arranged parallel to each other in contact with a magnetic tape being transported, and which has a structure to prevent a decrease in the contact pressure between the magnetic tape and the magnetic heads.

SUMMARY OF THE INVENTION

According to an aspect of the present invention, there is provided, a magnetic tape transport system for transporting a magnetic tape, including:
(a) a supply reel for feeding the magnetic tape;
(b) a take-up reel for winding the magnetic tape fed from the supply reel;
(c) a plurality of magnetic heads being arranged parallel to each other so that the magnetic tape slides in contact with the magnetic heads;
(d) a least one partition plate being placed between at least one corresponding pair of the magnetic heads adjacent to each other, the partition plate for dividing a space between the pair of the magnetic heads into an air space and a close-tape space;
(e) a negative pressure generation means for setting a pressure in the air space to be lower than that in the close-tape space; and
(f) at least one communicating path for allowing the air space and the close-tape space to communicate with each other, and provided at least one of between the partition plate and one of the corresponding pair of the magnetic heads and between the partition plate and the other in the pair.

According to another aspect of the present invention, there is provided, a servo writer for writing a servo signal on a magnetic tape, including:
(a) a supply reel for feeding the magnetic tape to be transported;
(b) a take-up reel for winding the magnetic tape being fed from the supply reel;
(c) a DC erase head being placed so that the magnetic tape slides in contact therewith;
(d) a servo write head being placed so that the magnetic tape slides in contact therewith, and the DC erase head and the servo write head being arranged parallel to each other, the DC erase head being positioned upstream of the servo write head in a transport direction of the magnetic tape;
(e) a partition plate being placed between the DC erase head and the servo write head, the partition plate for dividing a space between the DC erase head and the servo write head into an air space and a close-tape space;
(f) a negative pressure generation means for setting a pressure in the air space to be lower than that in the close-tape space; and
(g) at least one communicating path for allowing the air space and the close-tape space to communicate with each other, and provided at least one of between the partition plate and one of the DC erase head and the servo write head and between the partition plate and the other of the DC erase head and the servo write head.

According to still another aspect of the present invention, there is provided, a method for transporting a magnetic tape by use of the above-described magnetic tape transport system, including a step of transporting the magnetic tape while a pressure in the air space is lower than that in the close-tape space.

According to the magnetic tape transport system, the servo writer, and the method for transporting a magnetic tape which are all described above, the magnetic tape being transported is drawn toward the air space of which pressure is lower than that in the close-tape space. Consequently, it is possible to maintain the contact pressure between the heads and the magnetic tape at an appropriate level without any reductions.

BRIEF DESCRIPTION OF THE DRAWINGS

For more complete understanding of the present invention and the advantages hereof, reference is now made to the following description taken in conjunction with the accompanying drawings wherein.

DETAILED DESCRIPTION OF THE EXEMPLARY EMBODIMENTS OF THE INVENTION

Figure 1:
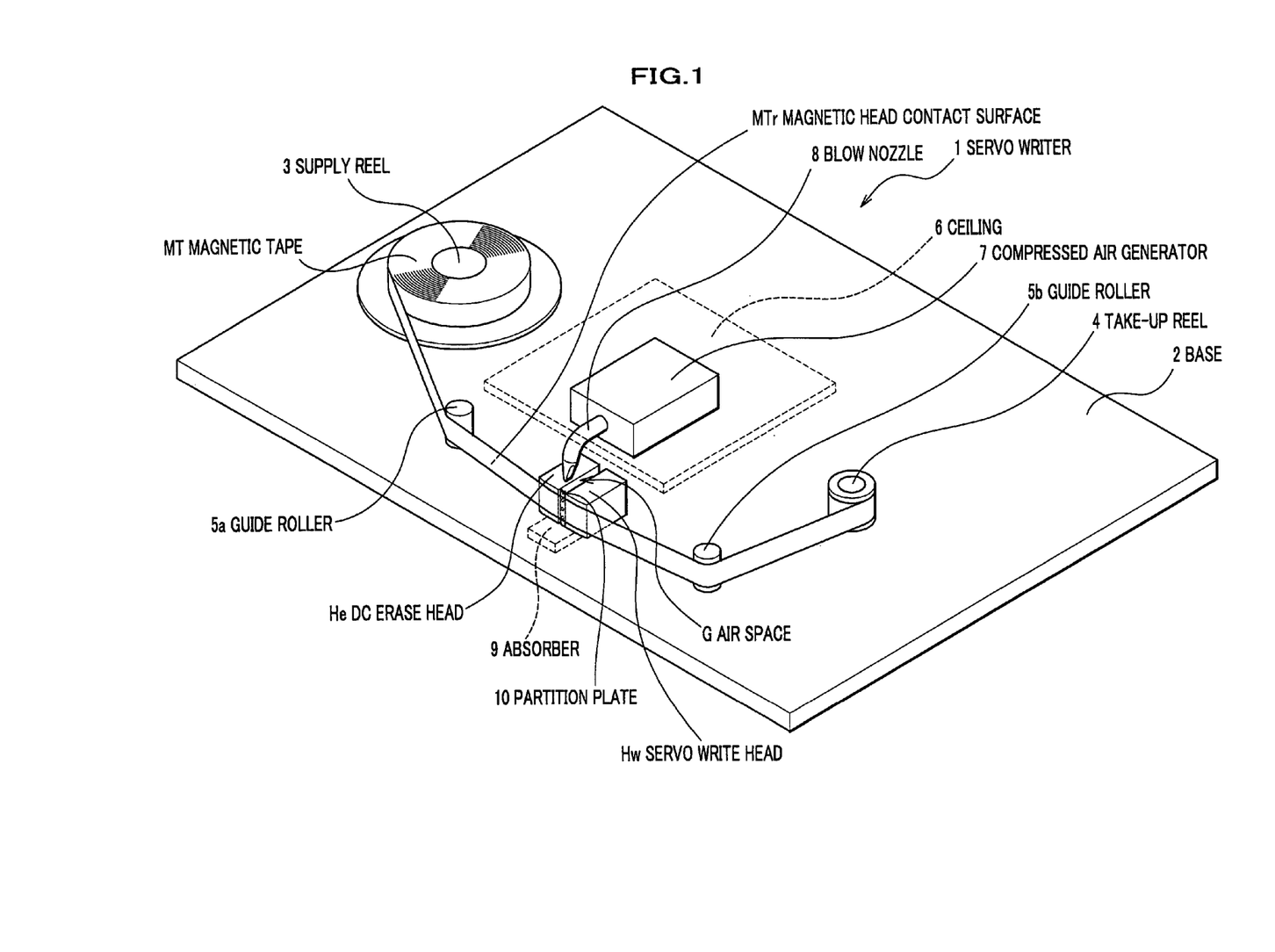
FIG. 1 is a schematic perspective view depicting an arrangement of a servo writer according to an embodiment of the present invention.
Figure 2:
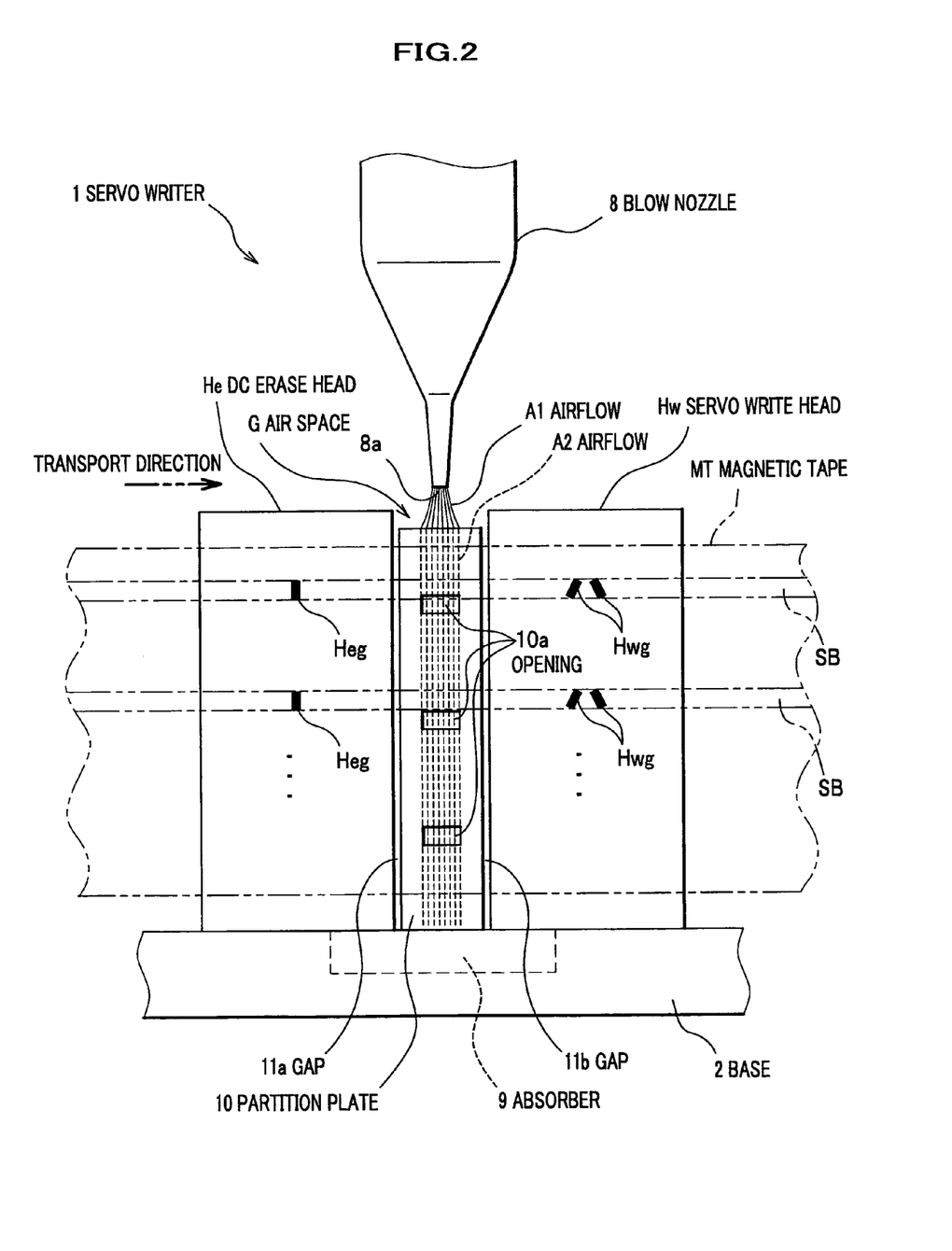
FIG. 2 is a plane view depicting magnetic heads of the servo writer according to the embodiment, as seen from the direction of a magnetic tape being transported.
Figure 3:
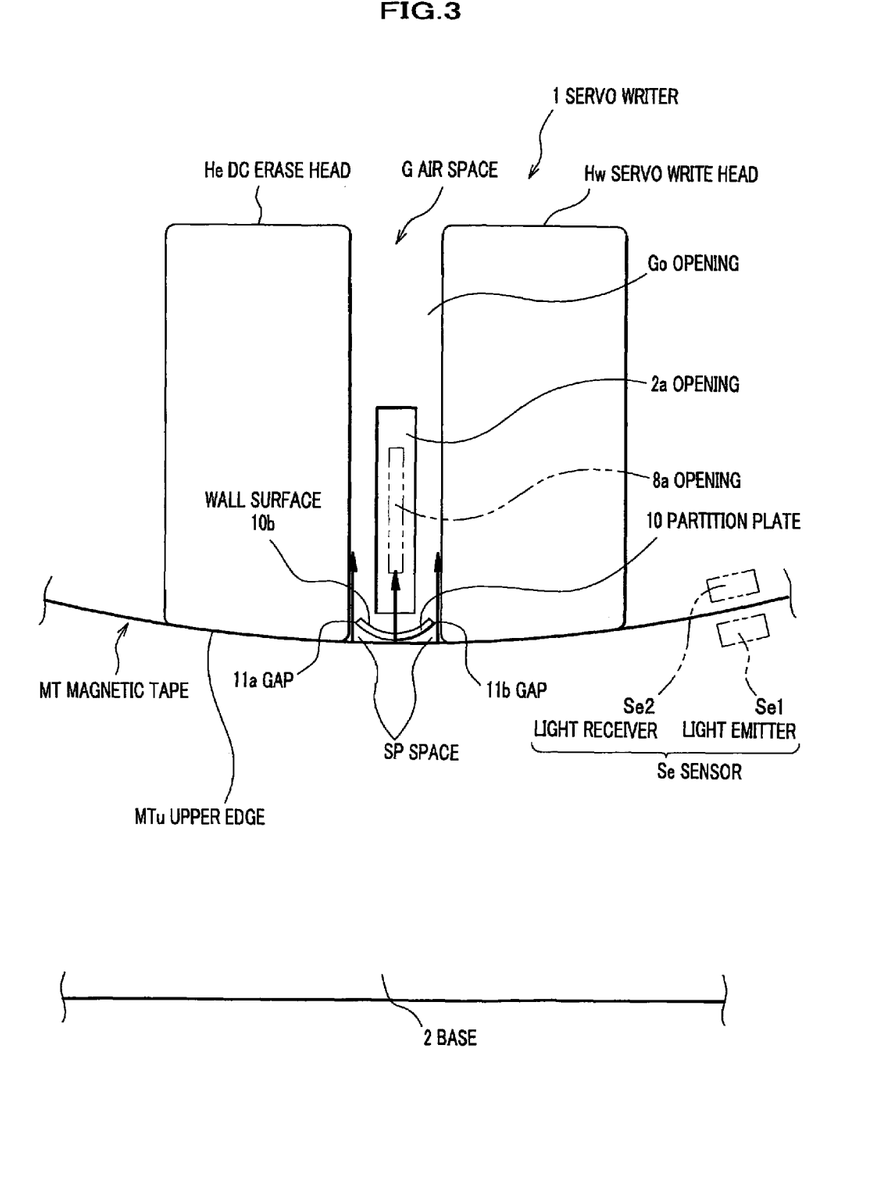
FIG. 3 is a plane view depicting the magnetic heads of the servo writer according to the embodiment, as seen from the direction of a blow nozzle of the servo writer.

A description will be given below of an embodiment of the present invention with reference to accompanying drawings as appropriate. FIG. 1 is a schematic perspective view depicting an arrangement of a servo writer according to an embodiment of the present invention; FIG. 2 is a plane view depicting magnetic heads (a DC erase head and a servo write head) of the servo writer according to the embodiment, as seen from the direction of a magnetic tape being transported; and FIG. 3 is a plane view depicting the magnetic heads (the DC erase head and the servo write head) of the servo writer according to the embodiment, as seen from the direction of a blow nozzle of the servo writer. Hereinafter, the directions of "up" and "down" correspond to those in FIG. 2.

Referring to FIG. 1, a servo writer 1 has a supply reel 3 and a take-up reel 4 on a base 2. Further, between the supply reel 3 and the take-up reel 4, a DC erase head He and a servo write head Hw are arranged and, between the supply reel 3 and the DC erase head He and between the servo write head Hw and the take-up reel 4, guide rollers 5a and 5b are arranged, respectively. Between the DC erase head He and the servo write head Hw, an air space G is formed. Above the air space G, a ceiling 6 is provided and, on the ceiling 6, a compressed air generator 7 equipped with a blow nozzle 8 is disposed. The blow nozzle 8 has an opening 2a (see FIG. 3) located directly above an opening Go of the air space G (see FIG. 3). Below the air space G, an absorber 9 fixed to the base 2 is placed. Near a magnetic tape MT being transported, a space SP (see FIG. 3) is formed and, between the air space G and the space SP, a partition plate 10 is positioned.

The servo writer 1 further includes motors that rotatably drive the supply reel 3 and the take-up reel 4, respectively, a controller that controls the components of the servo writer 1, and a verifying head that verifies servo signals written on the magnetic tape MT which are not all shown in the figures. Note that, herein, the servo writer 1 represents a magnetic tape transport system, the DC erase head He and the servo write head Hw represent a magnetic head, respectively, and the compressed air generator 7, the blow nozzle 8 and the absorber 9 represent an airflow generator in combination.

The supply reel 3, around which the blank magnetic tape MT is wound, is located upstream of the DC erase head He. The supply reel 3 is rotatably driven by the motor (not shown) at a predetermined speed, feeding the magnetic tape MT wound the-rearound to the DC erase head He at a predetermined speed such as 4 m/s. Now that "upstream" means the upstream in the transport direction of the magnetic tape MT.

The take-up reel 4 is located downstream of the servo write head Hw, and is rotatably driven by the motor (not shown) at a predetermined rotational frequency, winding the magnetic tape MT at a predetermined speed on which servo signals have been written by the servo write head Hw, and wrapping it therearound. Note that "downstream" means the downstream in the transport direction of the magnetic tape MT.

The guide rollers 5a and 5b, which are placed between the supply reel 3 and the DC erase head He and between the servo write head Hw and the take-up reel 4, respectively, are rotated to thereby transport the magnetic tape MT. In other words, the magnetic tape MT is fed from the supply reel 3, and is then guided to the DC erase head He and the servo write head Hw in the transport direction of the magnetic tape MT by means of the rotation of the guide roller 5a. Further, servo signals are written on the magnetic tape MT by the servo write head Hw, and the magnetic tape MT is then guided to the take-up reel 4 in the transport direction of the magnetic tape MT by means of the rotation of the guide roller 5b.

The compressed air generator 7 pushes out, to the blow nozzle 8, compressed air of an adjusted predetermined pressure such as 40 kPa. The blow nozzle 8 expels the compressed air to generate an airflow, and the airflow then passes through the air space G in parallel with the magnetic head contact surface MTr of the magnetic tape MT being transported.

Referring to FIG. 2, between the DC erase head He and the partition plate 10 and between the partition plate 10 and the servo write head Hw, gaps 11a and 11b are formed, respectively. Further, at the lateral center of the partition plate 10, rectangular openings 10a are arranged lengthwise. The DC erase head He and the servo write head Hw have head gaps Heg and head gaps Hwg, respectively, and the head gaps Heg and the respective head gaps Hwg are arranged in the longitudinal (transport) direction of the magnetic tape MT. Note that the gaps 11a and 11b and the openings 10a constitute a communicating path herein.

Referring to FIG. 3, the partition plate 10 is formed curving toward the magnetic tape MT being transported, and has an inner-curved wall surface 10b facing the air space G. Thanks to this wall surface 10b, the turbulent flow of air is prevented in the air space G, thus generating the improved uniform airflow. Moreover, the blow nozzle 8 has a planular opening 8a formed along the long side of the opening Go in the air space G. Owing to the planular shape, the airflow generated by the opening 8a smoothly flows into the opening Go in the air space G, promoting the generation of the uniform airflow. On the base 2 and below the blow nozzle 8, an opening 2a being a size larger than the opening 8a is formed. The airflow that has been supplied from the blow nozzle 8 and has pass through the air space G flows into the base 2 through the opening 2a, and is finally absorbed by the absorber 9 (see FIG. 2). Note that the opening 2a, the compressed air generator 7, the blow nozzle 8 and the absorber 9 constitute a negative pressure generation means herein.

Next, a description will be given below of operations in which the above servo writer 1 writes servo signals on the magnetic tape MT, with reference to mainly FIGS. 2 and 3.

First, as shown in FIG. 2, the blow nozzle 8 expels compressed air through the opening 8a to thereby generate an airflow A1. The airflow A1 is converted into a uniform airflow A2 by means of straightening of the partition plate 10. The airflow A2 passes through the air space G, and is finally absorbed by the absorber 9. In this case, as shown in FIG. 3, the pressure in the air space G is lower than that in the space SP, in accordance with Bernoulli's principle. Accordingly, the magnetic tape MT is drawn in the direction of arrows in FIG. 3 through the gaps 11a and 11b and the openings 10a (see FIG. 2). Consequently, the contact pressures between the DC erase head He and the magnetic tape MT and between the servo write head Hw and the magnetic tape MT are maintained at an appropriate level. Note that the pressure of the compressed air supplied from the compressed air generator 7 is adjusted so as not to cause the writing error of the servo signals, the displacement of the magnetic tape MT in the lateral direction, the abrasion of the DC erase head He and the servo write head Hw, and the damage of the magnetic tape MT.

Figure 4:
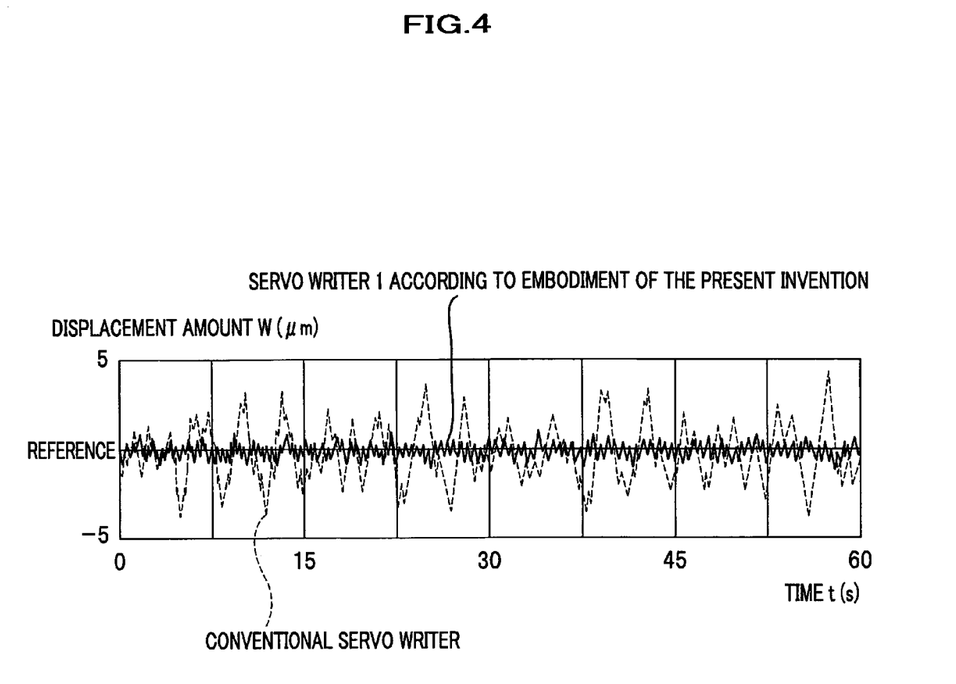
FIG. 4 is a graph showing the effect in which the servo writer 1 according to the embodiment prevents the displacement of the magnetic tape MT in the lateral direction during the transport.

FIG. 4 is a graph showing the effect in which the servo writer 1 according to this embodiment prevents the displacement of the magnetic tape MT in the lateral direction during the transport. In the graph of FIG. 4, a vertical axis represents a displacement amount (μm) of the magnetic tape MT in the lateral direction, and a horizontal axis represents time t(s). In the measurement, the transport speed of the magnetic tape MT was 4 m/s, and the pressure of the compressed air that was pushed out from the compressed air generator 7 to the blow nozzle 8 was 40 kPa. As a comparative example, is shown by a dot line, data obtained under the condition that the magnetic tape MT was transported at the same speed (4 m/s) by use of a conventional type servo writer, that is, a servo writer without the negative pressure generation means.

In this measurement, as shown in FIG. 3, a sensor Se composed of a light emitter Se1 and a light receiver Se2 was used, and they were arranged facing each other across an upper edge MTu of the magnetic tape MT to which the servo signals had been written. Then, the light emitter Se1 emitted light toward the light receiver Se2 during the transport of the magnetic tape. In this case, since the intensity of the light received by the light receiver Se2 was varied depending on the displace amount of the upper edge MTu, the light intensity detected by the light receiver Se2 and a reference light intensity were compared, so that the displacement amount w of the magnetic tape MT from a reference location in the lateral direction could be determined. Note that the reference location is where the reference light intensity is obtained.

As shown in FIG. 4, the conventional type servo writer had the displacement amount of about ±4 μm, but the servo writer 1 according to the present invention succeeded in reducing the displacement amount to within ±1 μm. In this embodiment, the compressed air that was pushed out from the compressed air generator 7 (see FIG. 1) to the blow nozzle 8 was set at equal to/more than 20 kPa, so that the replacement amount of the magnetic tape MT in the lateral direction could be reduced during the transport.

The contact pressure is appropriately adjusted in such a way, and the magnetic tape MT is then transported by rotatably driving the supply reel 3 and the take-up reel 4 (see FIG. 1). Further, as shown in FIG. 2, only the servo bands SB of the magnetic tape MT are DC-erased by the head gaps Heg of the DC erase head He in one direction (e.g. right direction in the figure) along the long side of the magnetic tape MT during the transport. Subsequently, the servo bands SB are magnetized by the head gaps Hwg of the servo write head Hw in the opposite direction (e.g. left direction in the figure). As a result, the servo signals are appropriately written on the servo bands SB of the magnetic tape MT.

Figure 5:
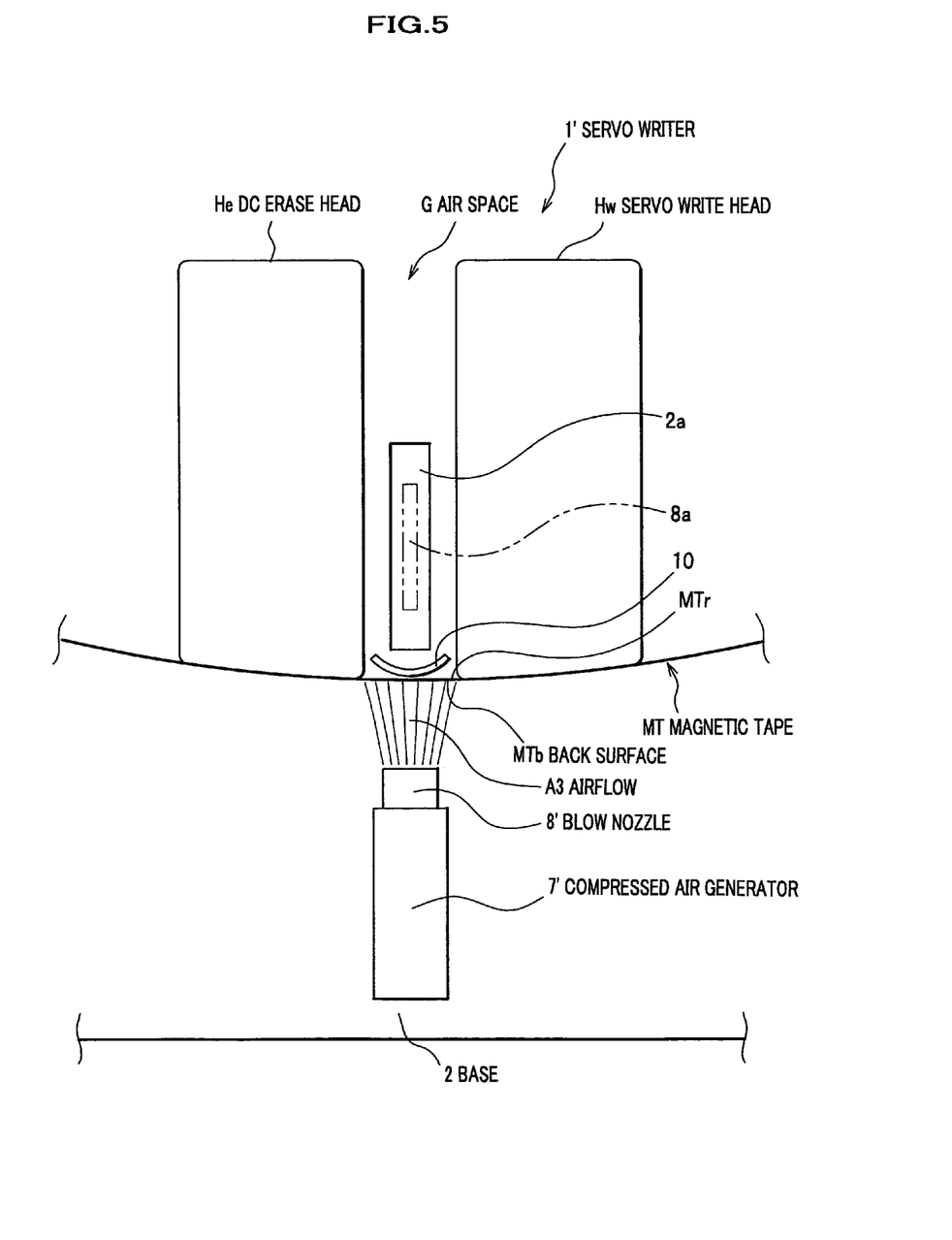
FIG. 5 is a plane view depicting magnetic heads of a servo writer according to a first modification of the present invention, as seen from the direction of a blow nozzle of the servo writer.

Next, a description will be given of the servo writer 1 according to a first modification of the embodiment above, with reference to FIG. 5. FIG. 5 is a plane view depicting magnetic heads of a servo writer according to the first modification, as seen from the direction of a blow nozzle of the servo writer.

Referring to FIG. 5, the servo writer 1' includes, in addition to the components described above, a compressed air generator 7' equipped with a blow nozzle 8'. This blow nozzle 8' faces a back surface MTb on the underside of the magnetic head contact surface MTr of the magnetic tape MT being transported. In this servo writer 1', the contact pressure is maintained at an appropriate level by above described way as well as by blowing an airflow A3 from the blow nozzle 8' of the compressed air generator 7' to the back surface MTb of the magnetic tape MT.

Figure 6:
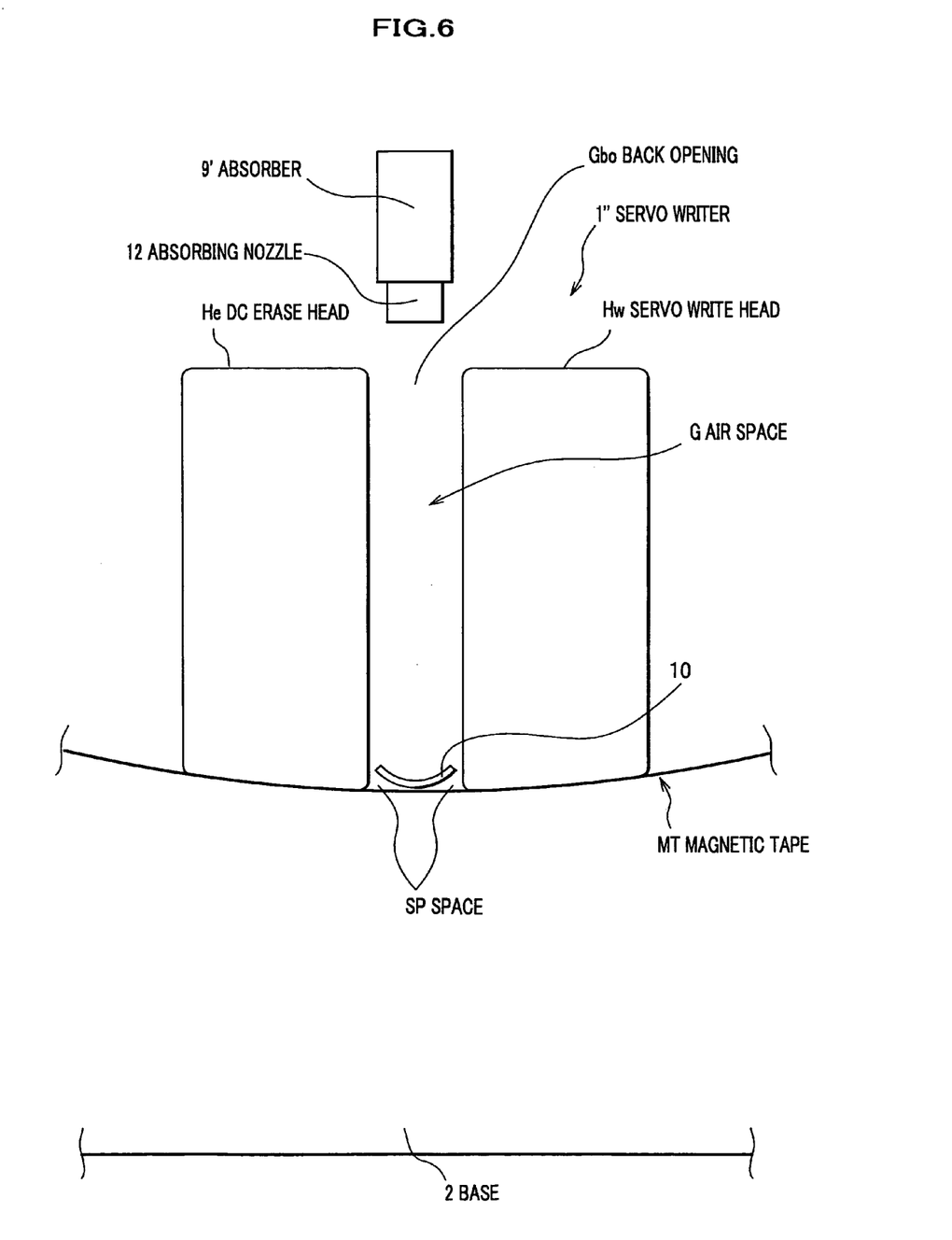
FIG. 6 is a plane view depicting magnetic heads of the servo writer according to a second modification of the present invention, as seen from the direction of a ceiling of the servo writer.

Furthermore, a description will be given of a servo writer according to a second modification of the embodiment, with reference to FIG. 6. FIG. 6 is a plane view depicting magnetic heads of the servo writer according to the second modification, as seen from the direction of the ceiling.

Referring to FIG. 6, a servo writer 1" excludes the opening 2a, the compressed air generator 7, the blow nozzle 8 and the absorber 9 which all have been described in the embodiment, but includes an absorber 9' instead, as the negative pressure generation means. The absorber 9' is equipped with an absorbing nozzle 12 facing a back opening Gbo in the air space G. The other components of the servo writer 1" are similar to those of the servo writer 1. In this servo writer 1", the absorber 9' absorbs air in the air space G through the absorbing nozzle 12. In response to the absorption, the pressure in the air space G is made lower than that in the space SP. The magnetic tape MT is then drawn toward the air space G, thereby ensuring that the contact pressure is appropriately maintained.

Up to this point, the embodiment of the present invention has been described, but note that the present invention is not limited to this embodiment. For example, in the embodiment, the airflow generator is composed of the compressed air generator 7, the blow nozzle 8 and the absorber 9 as shown in FIG. 1, but the present invention is not limited to this arrangement. Alternatively, the airflow generator according to the present invention may be confirmed to the compressed air generator 7 and the blow nozzle 8, or the absorber 9 alone. Further, the compressed air generator 7 and the absorbing nozzle 8 may be arranged inside the base 2, and the absorber 9 may be placed on the ceiling 6.

In the embodiment, the communicating path is composed of the gaps 11a and 11b and the openings 10a as shown in FIG. 2, but may be composed of either of the gaps 11a and 11b or the openings 10a. Further, the number of the communicating paths may be an arbitrary number.

In the embodiment, the present invention is applied to the servo writer in which the DC erase head and the servo write head are arranged parallel to each other, but the application of the present invention is not limited to the servo writer of this type. Alternatively, the present invention may be applied to servo writers in which a DC erase head, a servo write head and a verifying head are arranged parallel to one another. In this case, the negative pressure generation means needs to be set up so that negative pressure is generated in respective air spaces between the DC erase head and the servo write head and between the servo write head and the verifying head. Moreover, in the embodiment, the present invention is applied to the servo writer, but this application is not limited to servo writers. Alternatively, the present invention may be applied to magnetic tape drives in which an AC erase head and a recording/reproducing head are arranged parallel to each other.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A magnetic tape transport system for transporting a magnetic tape, comprising:
    a supply reel for feeding the magnetic tape;
    a take-up reel for winding the magnetic tape fed from the supply reel;
    a plurality of magnetic heads being arranged parallel to each other so that the magnetic tape slides in contact with the magnetic heads;
    a least one partition plate being placed between at least one corresponding pair of the magnetic heads adjacent to each other, the partition plate for dividing a space between the pair of the magnetic heads into an air space and a close-tape space;
    a negative pressure generation means for setting a pressure in the air space to be lower than that in the close-tape space; and
    at least one communicating path for allowing the air space and the close-tape space to communicate with each other, the communicating path being provided at least one of between the partition plate and one of the corresponding pair of the magnetic heads and between the partition plate and the other in the pair.

2. The magnetic tape transport system according to claim 1,
    wherein the negative pressure generator comprises an airflow generation means which generates an airflow, and which directs the airflow parallel to a contact surface of the magnetic tape with the magnetic heads in the air space.

3. The magnetic tape transport system according to claim 2,
    wherein the partition plate has an in-curved surface which faces the air space.

4. The magnetic tape transport system according to claim 3,
    wherein the airflow generator comprises a blow nozzle for expelling air, which has a planular opening in alignment with an opening of the air space.

5. The magnetic tape transport system according to claim 2,
    wherein the airflow generator comprises a blow nozzle for expelling air, which has a planular opening in alignment with an opening of the air space.

6. The magnetic tape transport system according to claim 1,
    wherein the negative pressure generation means comprises a compressed air blower for blowing compressed air onto the magnetic tape from an opposite side of the air space across the magnetic tape.

7. The magnetic tape transport system according to claim 1,
    wherein the negative pressure generation means comprises an air absorber for absorbing air in the air space.

8. A servo writer for writing a servo signal on a magnetic tape, comprising:
    a supply reel for feeding the magnetic tape to be transported;
    a take-up reel for winding the magnetic tape being fed from the supply reel;
    a DC erase head being placed so that the magnetic tape slides in contact therewith;
    a servo write head being placed so that the magnetic tape slides in contact therewith;
    the DC erase head and the servo write head being arranged parallel to each other, the DC erase head being positioned upstream of the servo write head in a transport direction of the magnetic tape;
    a partition plate being placed between the DC erase head and the servo write head, the partition plate for dividing a space between the DC erase head and the servo write head into an air space and a close-tape space;
    a negative pressure generation means for setting a pressure in the air space to be lower than that in the close-tape space; and
    at least one communicating path for allowing the air space and the close-tape space to communicate with each other, the communicating path being provided at least one of between the partition plate and one of the DC erase head and the servo write head and between the partition plate and the other of the DC erase head and the servo write head.

9. The servo writer according to claim 8,
    wherein the negative pressure generation means comprises an airflow generator which generates an airflow, and which directs the airflow parallel to a contact surface of the magnetic tape with the DC erase head and the servo write head in the air space.

10. The servo writer according to claim 9,
    wherein the partition plate has an in-curved surface which faces the air space.

11. The servo writer according to claim 10,
    wherein the airflow generator comprises a blow nozzle for expelling air, which has a planular opening in alignment with an opening of the air space.

12. The servo writer according to claim 9,
    wherein the airflow generator comprises a blow nozzle for expelling air, which has a planular opening in alignment with an opening of the air space.

13. The servo writer according to claim 8,
    wherein the negative pressure generation means comprises a compressed air blower for blowing compressed air onto the magnetic tape from an opposite side of the air space across the magnetic tape.

14. The servo writer according to claim 8,
    wherein the negative pressure generation means comprises an air absorber for absorbing air in the air space.

15. A method for transporting a magnetic tape by use of a magnetic tape transport system, the magnetic tape transport system including a supply reel for feeding the magnetic tape, a take-up reel for winding the magnetic tape fed from the supply reel, a plurality of magnetic heads being arranged parallel to each other so that the magnetic tape slides in contact with the magnetic heads, a least one partition plate being placed between at least one corresponding pair of the magnetic heads adjacent to each other, and the partition plate for dividing a space between the magnetic heads into an air space and a close-tape space, the method comprising:
    transporting the magnetic tape, while a pressure in the air space is lower than that in the close-tape space.

16. The method for transporting the magnetic tape according to claim 15,
    wherein, in transporting the magnetic tape, airflow is generated parallel to a contact surface of the magnetic tape with the magnetic heads in the air space.

17. The method for transporting the magnetic tape according to claim 15,
    wherein, in transporting the magnetic tape, compressed air is blown to the magnetic tape from an opposite side of the air space across the magnetic tape.

18. The method for transporting the magnetic tape according to claim 15,
wherein, in transporting the magnetic tape, air is absorbed in the air space.

19. The method for transporting the magnetic tape according to claim 18, wherein the air is absorbed by an absorber which is located below the partition plate.

20. The method for transporting the magnetic tape according to claim 15, wherein transporting the magnetic tape comprises transporting the magnetic tape from the supply reel to the take-up reel,
wherein a space between the partition plate and the magnetic tape comprises the close-tape space, and
wherein a space between the partition plate and opposite the close-tape space comprises the air space.

21. The method for transporting the magnetic tape according to claim 15, wherein the partition plate is a curved member which curves toward the magnetic tape and straightens to generate a uniform air flow.

22. The method for transporting the magnetic tape according to claim 15, wherein the air space extends along a gap between the at least one corresponding pair of magnetic heads.

23. The method for transporting the magnetic tape according to claim 15, wherein transporting the magnetic tape comprises DC-erasing the magnetic tape.

24. A magnetic tape transport system for transporting a magnetic tape, comprising:
a plurality of magnetic heads being arranged parallel to each other so that the magnetic tape slides in contact with the magnetic heads;
a least one partition plate being placed between at least one corresponding pair of the magnetic heads adjacent to each other, the partition plate for dividing a space between the pair of the magnetic heads into an air space and a close-tape space; and
a negative pressure generation means for setting a pressure in the air space to be lower than that in the close-tape space.

25. A servo writer for writing a servo signal on a magnetic tape, comprising:
a DC erase head being placed so that the magnetic tape slides in contact therewith;
a servo write head being placed so that the magnetic tape slides in contact therewith;
the DC erase head and the servo write head being arranged parallel to each other, the DC erase head being positioned upstream of the servo write head in a transport direction of the magnetic tape;
a partition plate being placed between the DC erase head and the servo write head, the partition plate for dividing a space between the DC erase head and the servo write head into an air space and a close-tape space; and
a negative pressure generation means for setting a pressure in the air space to be lower than that in the close-tape space.

* * * * *